UNITED STATES PATENT OFFICE.

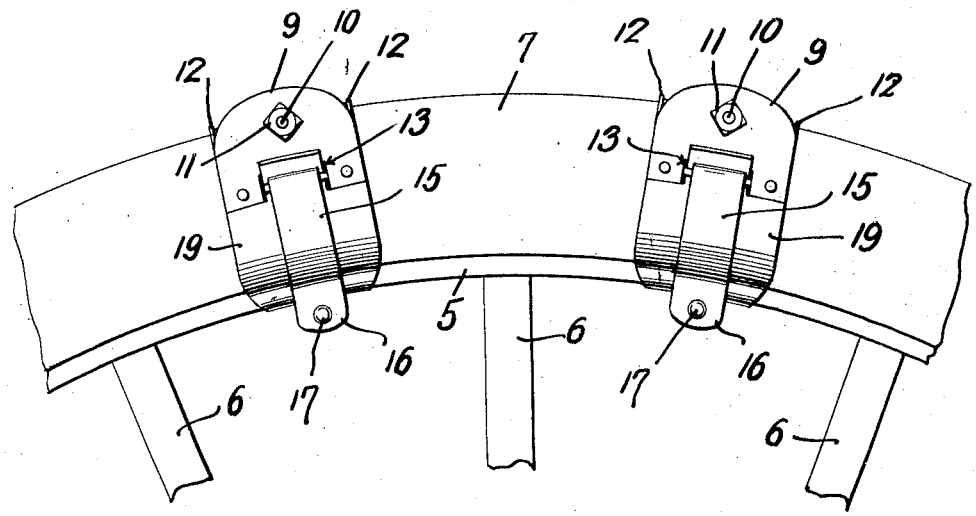
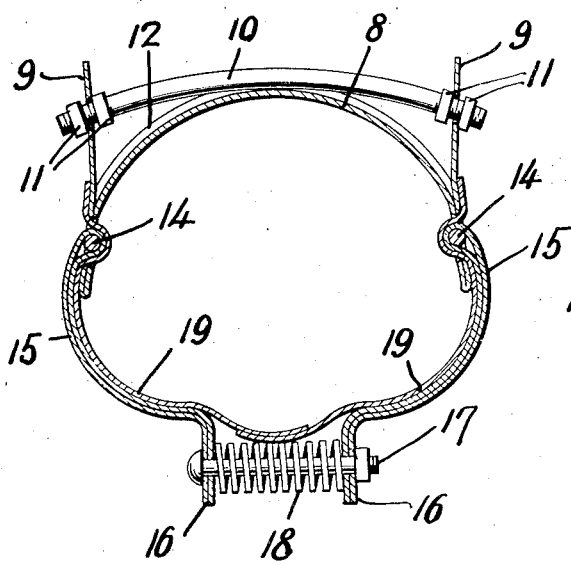
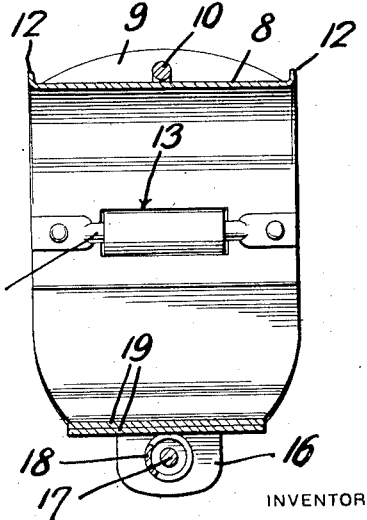

EMIL E. ELLISON, OF LITCHVILLE, NORTH DAKOTA.

WHEEL ATTACHMENT.

1,357,448.  Specification of Letters Patent.  Patented Nov. 2, 1920.

Application filed April 24, 1918. Serial No. 230,470.

*To all whom it may concern:*

Be it known that I, EMIL E. ELLISON, a citizen of the United States, residing at Litchville, in the county of Barnes and State of North Dakota, have invented certain new and useful Improvements in Wheel Attachments, of which the following is a specification.

This invention relates to wheel attachments and particularly to anti-skidding devices, having for its primary object to provide improved means obviating the now-generally used tire chains for increasing the traction of a wheel.

A further object of the invention is to provide an attachment of the purpose mentioned which is of simple construction and which may be manufactured at low cost, which is capable of being easily and quickly applied to the wheel, and which has its various parts so constructed and arranged as to minimize the opportunity for wear and breakage.

A still further object of the invention is to provide an attachment which may be readily applied to any part of the vehicle wheel and which may be adjusted circumferentially of the latter.

With these objects in view, together with others which will appear as the description proceeds, the invention resides in the novel formation, combination and arrangement of parts, all as will be described more fully hereinafter, illustrated in the drawings, and particularly pointed out in the claims.

In the drawings:—

Figure 1 is a side elevation of a part of a conventional form of vehicle wheel and illustrating the application of attachments constructed in accordance with my invention, Fig. 2 is an enlarged transverse sectional view taken through one of the attachments, and Fig. 3 is a longitudinal sectional view taken vertically through Fig. 2.

Referring now more particularly to the drawings, 5 indicates the wheel rim, 6 the spokes, and 7 is a conventional form of a tire, either cushion or pneumatic, applied to the rim.

The attachments of my invention constitute a plurality of gripping members adapted to be arranged independently of each other upon the wheel rim and inclosing the tire. These attachments are all of identical construction, and are capable of being moved longitudinally or circumferentially of the rim. Each is equipped with improved means for securing the same firmly upon the rim and tire, and each has projecting cleat members adapted to engage with the ground to enhance the traction of the wheel.

The grip member or attachment of the invention includes an arcuate plate indicated at 8, the curvature of the said plate being similar to that of the standard tire, and this plate is adapted to lie upon the tread portion of the tire and transversely thereof. The extremities of this plate extend around to the sides of the tire, and are bent upon themselves so that the extreme ends of the plate form blades or cleat members 9. These blades extend radially beyond the tire and are disposed longitudinally thereof, and the same are reinforced by a laterally disposed connecting bolt 10. This bolt extends at its extremities through suitable apertures in the blades, and lock nuts 11 hold the bolts rigidly to the blades and prevent the latter from moving toward or away from each other. This bolt furthermore assists in increasing the traction of the wheel as the same comes in contact with the ground as the wheel rotates. It will be observed that the ends of the plate 8 are turned outwardly providing gripping flanges 12.

Each end of the arcuate plate 8 is provided with a longitudinally disposed aperture 13, within which a longitudinally disposed bearing pin 14 is arranged. These pins 14 rotatably support the inner ends of connecting members in the form of metallic straps 15. These straps are bent around the pins 14 so as to freely swing thereon, and are curved inwardly toward each other as shown. The free ends of these strap members are bent outwardly providing ears 16, the latter being disposed parallel to each other and spaced apart when the said strap members have been swung to their inward limit. The spaced ears are connected by a tie bolt 17, around which an expansion spring 18 is coiled. This spring bears at its end against the spaced ears 16, normally forcing the same apart.

In order that the device may be applied to the wheel without danger of scratching the rim or tire thereof, buffer fabrics 19 are provided. These buffers are extended at their outer ends through the openings 13 in the arcuate plates, and extend around upon the inner faces of the connecting members 15, being interposed between the latter and the wheel rim. The fabrics guard the rim against becoming scratched or rubbed.

In use, the attachment is opened by removing the bolts 17. When the ends of the members 15 are thus disconnected, they may be swung outwardly upon the pins 14, and the plate 8 may readily be applied to the tread of the tire. When properly positioned upon the tire, the device is closed by swinging the connecting members 15 inwardly, it being understood that the fabrics 19 are applied to the inner faces of said members before the device is applied to the wheel. The members 15 will close about the rim of the wheel, and the bolt 17 may then be applied to the ears 16. When the nut upon the bolt 17 is tightened, the ears will be drawn toward each other, whereupon the members 15 will be tightly bound to the tire sides and over the rim. The pressure exerted by the spring 18 causes outward pressure upon the bolt 17, whereupon the nut will be held against rotation. By applying a device of this character to the tire, between the various spokes of the wheel, it is obvious that efficient gripping means for the wheel is supplied. Any desired number of such devices may, of course, be used, and the attachments are capable of being adjusted circumferentially of the wheel. The bolt or rod 10 and flanges 12 constitute efficient cleats for increasing the traction of wheel, while the flanges 9 will prevent the wheel from sliding sideways upon the ground.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described the invention, what I claim as new and desire to secure by Letters Patent is:—

1. An anti-skid device, comprising a plate adapted to be secured to the tread of a tire, and having its end portions at the sides of the tire outwardly bent and apertured, a bolt having its ends threaded and passed through the apertures of the outer extensions of the plate and outwardly curved between its ends, and pairs of nuts on the threaded ends of the bolt having the said outer extensions held between them.

2. An anti-skid device, comprising a plate adapted to be fitted to the tread of a tire and having openings in its end portions at the sides of the tire, pins disposed upon the inner side of the plate opposite the openings in the end portions thereof, with their ends projecting beyond the openings, straps folded about the pins to receive the latter in their bights, and means connecting the ends of the strips and retaining the device in position on the tire.

3. An anti-skid device, comprising a plate adapted to be fitted to the tread of a tire and having openings in its end portions at the sides of the tire, pins disposed upon the inner side of the plate opposite the openings in the end portions thereof, with their ends projecting beyond the openings, straps folded about the pins to receive the latter in their bights, means connecting the ends of the straps and retaining the device in position on the tire, and buffer means extending across the gap formed between the connected ends of the straps and secured to the plate by passing through the openings thereof and about the pins and the folded ends of the straps.

In testimony whereof I affix my signature in presence of two witnesses.

EMIL E. ELLISON.

Witnesses:
 H. HODEM,
 IDA A. NEVERMAN.